United States Patent [19]
Fattore et al.

[11] 3,900,426
[45] Aug. 19, 1975

[54] CATALYSTS FOR THE OXIDATION OF OLEFINES

[75] Inventors: Vittorio Fattore; Paolo Moreschini; Bruno Notari, all of San Donato, Milanese, Italy

[73] Assignee: Snam Progetti S.p.A., San Donato Milanese, Italy

[22] Filed: Sept. 1, 1972

[21] Appl. No.: 285,651

[30] Foreign Application Priority Data
Sept. 2, 1971 Italy .................................. 28151/71

[52] U.S. Cl. .............. 252/439; 252/456; 260/465.3
[51] Int. Cl. ......................... B01j 11/74; B01j 11/06
[58] Field of Search ................... 252/439, 456, 472; 260/465.3

[56] References Cited
UNITED STATES PATENTS

| | | | |
|---|---|---|---|
| 3,544,616 | 12/1970 | Grasselli et al. | 260/465.3 |
| 3,668,147 | 6/1972 | Yoshino et al. | 252/439 X |
| 3,686,267 | 8/1972 | Taylor | 260/465.3 |

*Primary Examiner*—Carl F. Dees
*Attorney, Agent, or Firm*—Ralph M. Watson, Esq.

[57] ABSTRACT

A new group of compounds is described, whose members are adapted to catalyze the oxidation of olefins to unsaturated nitriles, and which are represented by the empirical formula:

$Sb_1Fe_mMe_nCo_pO_q$ wherein Me is tellurium or arsenic, $m$ is in the range of 0.1 to 1, $n$ is in the range of 0 to 0.5, $p$ is in the range of 0.005 to 1 and $q$ is in the range of 2.2 to 6.5.

2 Claims, No Drawings

CATALYSTS FOR THE OXIDATION OF OLEFINES

The present invention relates to new catalysts for obtaining oxidation products of olefines.

More particularly the present invention concerns new catalysts containing iron and antimony in the presence of promoters.

In the art catalysts are known for the oxidation and ammonoxidation of olefins and which are constituted by iron and antimony, for instance Japanese Pat. No. 420,264 (Nitto) and Belgian Pat. No. 622,025.

It is also known from the art that said catalysts can be activated by the addition of promoters. This is described in Italian Pat. No. 359,097 and in U.S. Pat. No. 3,338,952. In particular U.S. Pat. No. 3,338,952 reports that, as promoters, use can be made of practically all the elements of the periodic table. Said large definition of the elements useful as promoters is restricted, always in the same patent, to 25 elements.

It is therefore to be supposed that only those elements cited in this restricted list are active as promoters of iron and antimony base catalysts.

It has now been found that a catalyst containing iron and antimony, possibly in the presence of other elements, has a better catalytic activity when there are present small amounts of cobalt.

The improved catalyst according to the present invention may be represented by the following general empirical formula $$Sb_lFe_mMe_nCo_pO_q$$

wherein Me is a metal selected between tellurium and arsenic, $m$ is in the range of from 0.1 to 1
$n$ is in the range of from 0 to 0.5
$p$ is in the range of from 0.005 to 1
$q$ is in the range of from 2.2 to 6.5

Said improved catalyst can be advantageously used for the synthesis of unsaturated nitriles starting from olefines, ammonia, oxygen or gases containing oxygen and of unsaturated aldehydes and dienes starting from olefines and oxygen or air and possibly water. The catalyst according to the present invention has been particularly advantageous for the synthesis of acrylonitrile starting from propylene, ammonia, oxygen or air at temperatures in the range of from 350°C to 500°C.

For the preparation of said catalyst use can be made of oxides, salts and acids of the elements which will form part of the catalytic composition and also of the elements in the metallic state.

The catalyst according to the present invention can be prepared according to the methods used in the art for this type of compound. For instance it can be obtained by co-precipitation starting from soluble compounds of the metals by addition of an aqueous alkaline solution. Otherwise it can be prepared by reaction of a soluble salt such as iron nitrate with an antimony oxide and evaporation up to dryness.

The cobalt compound and possibly the other promoters can be added together or separately at any stage of the preparation but preferably before the calcination of the catalyst at high temperature.

The catalysts prepared according to the different techniques are always dried and finally calcined up to temperatures ranging from 750°C to 920°C in air for a time ranging from 2 to 16 hours.

The catalysts according to the present invention can be utilized as such or supported on a suitable carrier such as silica, celite, carborundum, titanium oxide and the like.

They can be used either in reactors having a fixed catalyst bed or in reactors having a fluid bed catalyst.

The following examples illustrate the invention without limiting the same; examples 11 and 12 are given for comparative purposes and are not included in the ambit of the present invention.

EXAMPLE 1

404 grams of $Fe(NO_3)_3.9h_2O$ were heated at 80°C. Separately 5.8 grams of $Co(NO_3)_2.6h_2O$ were dissolved in 50 cc of water and were poured into the iron nitrate solution. The resulting solution was kept under stirring at 80°C and in small portions 291.5 grams of $Sb_2O_3$ were added.

The whole was dried up to 230°C for 4 hours.

The mass was granulated and calcined at 800°C for 2 hours. 6 cc of the so obtained catalyst were loaded in a steel tubular reactor having an internal diameter of 10 mm, heated by an electric oven. The mixture fed to the reactor at a rate of 4.3 l/h had the following composition (molar ratios): propylene/air/ammonia = 1/12/1.3.

The tests, carried out after a suitable stabilization at each selected temperature at a pressure slightly higher than the atmospheric one, gave the following results:

| T °C | C (%) | S (%) | R (%) |
|---|---|---|---|
| 450 | 76 | 72.5 | 55 |
| 465 | 82 | 72 | 59 |
| 480 | 87 | 68 | 59.2 | wherein T is the reaction temperature

C is the propylene molar conversion expressed in percentage

S is the molar selectivity to acrylonitrile referred to the moles of converted propylene R is the molar yield to acrylonitrile with respect to the fed propylene.

EXAMPLE 2

A solution of 404 grams of $Fe(NO_3)_3.9H_2O$ in 100 cc of $H_2O$ was prepared.

To said solution a solution containing 5.8 grams of $Co(NO_3)_2.6H_2O$ and 11.5 grams of $H_6TeO_6$ in 100 cc of $H_2O$ was added.

The resulting solution was brought to 70°C and in small fractions 291.5 grams of $Sb_2O_3$ were subsequently added thereto.

The final mixture was dried and the powder was again dried in a stove at 200°C for 8 hours.

The product was granulated and then calcined at 800°C for 5 hours. The tests, carried out after a suitable stabilization at each selected temperature, at the experimental conditions referred to in example 1, gave the following results:

| T °C | C (%) | S (%) | R (%) |
|---|---|---|---|
| 450 | 76 | 72 | 55 |
| 470 | 89 | 84 | 75 |
| 475 | 96 | 81 | 78 |

EXAMPLE 3

A catalyst having the same composition as that of example 2 was prepared in the following way.

To a solution of 135 grams of $FeCl_3.6H_2O$ in 250 cc of $H_2O$ a solution was added of 228 grams of $SbCl_3$ in 400 cc of $H_2O$ and 50cc of HCl at 36%.

To the resulting solution $NH_4OH$ at 28% was added up to neutralization. The precipitate was filtered and washed 2 times with 100 cc of water. A solution containing 5.7 grams of $H_6TeO_6$ and 2.4 grams of $CoCl_2$ was added to the precipitate.

The mixture was brought to the boil up to a complete $H_2O$ removal. The so obtained product was dried for 8 hours at 250°C, granulated and then calcined at 850°C for 4 hours. The catalyst, tested under the same conditions as in example 1 gave the following results:

| T (°C) | C (%) | S (%) | R (%) |
|---|---|---|---|
| 465 | 88 | 81 | 71 |
| 475 | 93 | 78 | 73 |

EXAMPLE 4

A catalyst of the same composition as the one of example 2, but supported on $SiO_2$(30% by weight) was prepared as follows.

2.9 grams of $Co(NO_3)_2.6H_2O$ and 5.7 grams of $H_6TeO_6$ were added to a solution containing 202 grams of $Fe(NO_3)_3.9H_2O$ in 100 cc of water. 145 grams of $Sb_2O_3$ were added in small portions to said solution. To the so obtained slurry 280 grams of $SiO_2$ sol (30% by weight $SiO_2$) were added and the whole was dried under continuous stirring.

The obtained product was dried at 250°C for 8 hours and calcined at 800°C for 5 hours.

The catalyst, tested at the same conditions as in example 1, gave the following results.

| T °C | C (%) | S (%) | R (%) |
|---|---|---|---|
| 470 | 85 | 82 | 70 |
| 480 | 93 | 79 | 73 |

EXAMPLE 5

121.7 grams of Sb in powder were added in small portions to a solution constituted by 500 cc of $HNO_3$ at 65% and 500 cc of $H_2O$.

The mixture was maintained at 70°C for 2 hours, then the upper liquid layer was removed by decantation.

To the solid product a solution was added containing 101 grams of $Fe(NO_3)_3.9H_2O$, 5.7 grams of $As_2O_5$, 7.2 grams of $Co(NO_3)_2.6H_2O$ in 250 cc of water.

The mixture was let boil up to dryness and the powder obtained in said way was dried at 250°C for 8 hours.

The product was granulated and calcined at 800°C for 5 hours.

The catalyst, tested under the same conditions as in example 1, gave the following results:

| T (°C) | C (%) | S (%) | R (%) |
|---|---|---|---|
| 450 | 66 | 84 | 55.4 |
| 470 | 77 | 79 | 60.8 |
| 480 | 81 | 77 | 62.4 |

EXAMPLE 6

A catalyst prepared as in example 5, but calcined at 920°C for 5 hours, tested at the same conditions as in example 1, gave the following results:

| T (°C) | C (%) | S (%) | R (%) |
|---|---|---|---|
| 450 | 62 | 76 | 47 |
| 470 | 71 | 74 | 53 |

EXAMPLE 7

The catalyst described in example 2 was tested for ammoxidation reaction of isobutene to metacrylonitrile under the following experimental conditions: catalyst volume: 6 cc; feed rate 3 l/h; feed mixture composition (molar ratio): isobutene/air/$NH_3$/$H_2O$= 1/15/1.3/5; reactions pressure slightly higher than the atmospheric pressure. The following results were obtained:

| T (°C) | C (%) | S (%) | R (%) |
|---|---|---|---|
| 400 | 78 | 76 | 59 |
| 420 | 95 | 74 | 70 |

EXAMPLE 8

The catalyst described in example 2 was tested for the oxidation reaction of propylene to acrolein under the following experimental conditions: catalyst volume 6 cc; feed rate 3.5 l/h; feed mixture composition (molar ratios): propylene/air/$H_2O$= 1/15/5; reaction pressure slightly higher than the atmospheric pressure. The following results were obtained:

| T (°C) | C (%) | S (%) | R (%) |
|---|---|---|---|
| 450 | 82 | 80 | 66 |
| 460 | 88 | 77 | 68 |

EXAMPLE 9

The catalyst described in example 2 was tested for the oxidation reaction of isobutene to metacrolein at the following experimental conditions: catalyst volume 6 cc; feed rate 5.5 l/h; feed mixture composition (molar ratios): isobutene/air/$H_2O$ = 1/20/5; reaction pressure slightly higher than the atmospheric pressure. The following results were obtained:

| T (°C) | C (%) | S (%) | R (%) |
|---|---|---|---|
| 400 | 90 | 65 | 58 |
| 410 | 94 | 62 | 58 |

EXAMPLE 10

The catalyst described in example 2 was tested for the reaction of oxidative dehydrogenation of butenes (pure isomers or isomer mixtures) to butadiene at the following experimental conditions: catalyst volume 6 cc; feed rate: 2.5 l/h; feed mixture composition (molar ratios): olefine/air/$H_2O$ = 1/8/2 : reaction pressure slightly higher than the atmospheric pressure.

The following results were obtained:

|  | T (°C) | C (%) | S (%) | R (%) |
|---|---|---|---|---|
| butene-1 | 390 | 94 | 88 | 83 |
| butene-2 | 415 | 75 | 76 | 57 |
| butene-1 50%) | 410 | 83 | 80 | 66 |
| butene-2 50%) |  |  |  |  |

EXAMPLE 11

A catalyst having a molar ratio between antimony and iron equal to 2/1 was prepared as follows.

291.5 grams of $Sb_2O_3$ were added in small portions to a solution of 404 grams of $Fe(NO_3)_3 \cdot 9H_2O$ in 100 cc of $H_2O$, heated under stirring at 80°C.

The resulting mixture was brought to dryness and the powder was dried at 250°C for 8 hours.

The product was then granulated and calcined at 800°C for 5 hours. The catalyst was tested in a microreactor for the ammoxidation to acrylonitrile at the conditions of example 1; the following results were obtained:

| T (°C) | C (%) | S (%) | R (%) |
|---|---|---|---|
| 440 | 73 | 70 | 51.1 |
| 455 | 80 | 68 | 54.4 |
| 465 | 84 | 65 | 54.6 |

EXAMPLE 12

A catalyst having molar ratios among antimony, iron and tellurium equal to 2/1/0.05 was prepared as follows.

291.5 grams of $Sb_2O_3$ were added in small portions to a solution of 404 grams of $Fe(NO_3)_3 \cdot 9H_2O$ in 100 cc of $H_2O$, at 80°C, under stirring. The resulting mixture was brought to dryness and the powder was dried at 250°C for 4 hours. Said powder was impregnated with an aqueous solution obtained by dissolving 11.5 grams of $H_6TeO_6$ in 50 cc of water. The whole was again dried, tabletted and calcined at 800°C for 2 hours. The catalyst was tested in a microreactor for the ammoxidation reaction of propylene to acrylonitrile at the conditions described in example 1. The following results were obtained.

| T (°C) | C (%) | S (%) | R (%) |
|---|---|---|---|
| 460 | 72 | 76 | 54.7 |
| 475 | 81 | 74 | 60 |
| 485 | 85 | 71 | 60.3 |

What we claim is:

1. A catalyst for the oxidation of olefines corresponding to the following general formula $$Sb_lFe_mMe_nCo_pO_q$$

wherein Me is a metal selected from tellurium and arsenic, $m$ is in the range of 0.1 to 1
$n$ is in the range of 0 to 0.5
$p$ is in the range of 0.005 to 1
$q$ is in the range of 2.2 to 6.5

2. Catalyst as claimed in claim 1 characterized in that it is supported on a member of the group consisting of silica, celite, carborundum and titanium oxide.

* * * * *

UNITED STATES PATENT AND TRADEMARK OFFICE
CERTIFICATE OF CORRECTION

PATENT NO. : 3,900,426
DATED : August 19, 1975
INVENTOR(S) : Vittorio Fattore, Paolo Moreschini and Bruno Notari It is certified that error appears in the above—identified patent and that said Letters Patent are hereby corrected as shown below:

Column 2, line 11, change "9h2O" to -- $9H_2O$ -- line 12, change "6h$_2$O" to -- $6H_2O$ --

Column 4, line 26, change "Ih" to -- 1/h -- line 42, change "Ih" to -- 1/h --

Signed and Sealed this ninth Day of December 1975

[SEAL]

Attest:

RUTH C. MASON
*Attesting Officer*

C. MARSHALL DANN
*Commissioner of Patents and Trademarks*